Feb. 3, 1931.  C. G. STRANDLUND  1,790,956
ADJUSTABLE SUPPORT FOR COLTER SHANKS
Filed Aug. 4, 1927
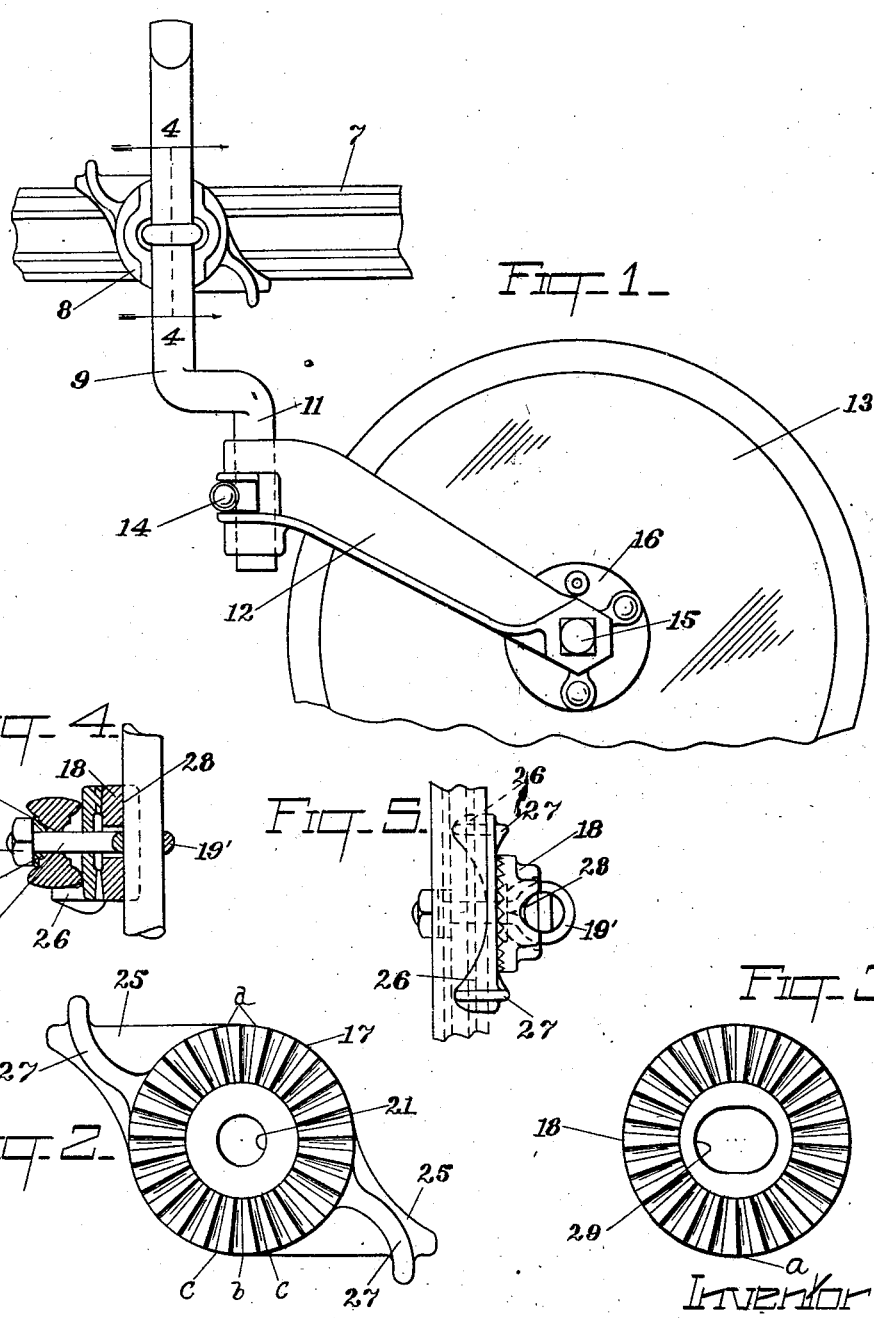

Patented Feb. 3, 1931

1,790,956

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

ADJUSTABLE SUPPORT FOR COLTER SHANKS

Application filed August 4, 1927. Serial No. 210,510.

The present invention relates to improved means for mounting rolling colters, such as are employed on plows for cutting down through sod and trash in advance of the plow point. More specifically, the invention aims to provide improved supporting means for securing the shank of the colter to the plow beam or other part of the plow frame, which supporting means will have the two-fold characteristic of: first, permitting a wide variety of adjustments of the colter shank and these to a relatively minute degree, for adapting the operation of the colter to all possible conditions; and, second, rigidly securing the colter shank in firmly fixed position so that the stresses set up in the operation of the colter cannot loosen the adjustment or otherwise disturb the desired setting of the colter.

One of the features by which I attain the foregoing comprises employing two relatively rotatable clamping plates having cooperating radially toothed surfaces which, by relative rotation therebetween, afford comparatively coarse angular adjustments of the shank equal in angular extent to one or more teeth on the clamping surfaces; and supplementing this coarse adjustment by an arrangement which permits the rotatable clamping plate to be displaced angularly with respect to the colter shank, whereby relatively fine adjustments of less than the width of a tooth can be obtained.

Another feature of the invention resides in the arrangement of the parts whereby all of the various adjustments of the colter shank are obtained and held at one point. For example, the longitudinal or endwise adjustment of the shank, its axial rotative adjustment, and the fore and aft angular adjustment of the shank are all held by one bolt. It is, therefore, possible to make all of the aforesaid adjustments at one point, and to thereupon set all of these adjustments simultaneously by tightening up on this bolt. Thus, there is avoided the objection of first getting one adjustment set to a nicety and then losing this adjustment in endeavoring to secure another.

Referring to the accompanying drawing wherein I have illustrated a preferred embodiment of my invention:

Fig. 1 is a fragmentary side elevational view illustrating the colter and the present mounting means therefor.

Fig. 2 is an elevational view of the toothed face of the stationary clamping plate.

Fig. 3 is a similar view of the rotatable clamping plate.

Fig. 4 is a vertical sectional view through the supporting device, taken on the plane of the line 4—4 of Figure 1, and Figure 5 is a plan view of the device, looking downwardly in Figure 1.

The plow beam or other corresponding part of the plow structure is indicated at 7. The present adjustable support, which has been designated 8 in its entirety, is secured to this plow beam in a manner which will hereinafter appear. Carried by such support is the colter shank 9, which has a crank or offset portion 11 at its lower end. Rotatably supported on such offset portion is a yoke 12 in which the colter disk 13 is journaled. Any suitable collar or like means 14 may be provided for holding the yoke 12 at a definite height on the offset portion 11 of the colter shank, such collar permitting the yoke to swivel freely to either side, so that the colter has a caster wheel movement around the lower end of the shank. Any suitable arrangement of pivot bolt 15 and bearing collars 16 may be provided for rotatably supporting the colter between the lower ends of the fork arms 12.

The adjustable support 8 comprises two radially toothed plates 17 and 18, frequently referred to as "rosettes". The plate 17 constitutes the stationary member of the pair, being non-rotatably held against the side of the plow beam 7 by an eye bolt 19. The shank of the eye bolt passes through a central opening 21 in the plate 17, and through a hole 22 which is drilled in the web of the plow beam at the desired point of mounting of the supporting device. The end of the bolt 19 receives a nut 23, which bears against a conical or depressed washer 24, shaped to conform to the lateral surface of the plow beam. For positively restraining rotation of the plate 17, the latter is provided with two projecting lugs 25—25, preferably formed integral with the plate, and having laterally projecting flanges 26, which engage with the upper and lower edges of the beam 7. The resistance to movement of the colter through the soil tends to rotate or rock the plate 17 in a counter-clockwise direction (as viewed in Fig. 1), but has no tendency to rock this plate in the opposite direction. Accordingly, I have extended the lugs 25 from the upper left-hand side of the clamping plate and from the lower right-hand side thereof, for engaging over the plow beam at points which will most effectively resist such turning movement. The lugs are shown as being reinforced by ribs 27, cast integral therewith and extending over the outer sides of the flanges 26.

The outer face of the rotatable clamping plate 18 is formed with a diametrical groove 28 extending transversely across the same. This groove is tapered to have the colter shank clamped therein, and as shown in Fig. 5, it will be noted that this groove is of a tapered formation so that the colter shank can be held therein in a wedging grip. The shank is drawn into wedging engagement in the groove 28 by the eye bolt 19. The eye portion 19' of the bolt has a loose fit in a slot or elongated opening 29 in the center of the rotatable clamping plate 18. In assembling the device, the colter shank is passed up through the eye 19' and is alined with the groove 28. Thereupon, by tightening up on the nut 23 on the outer end of the eye bolt, the eye portion of the bolt is drawn inwardly in the elongated opening 29, and in consequence of the pull exerted by the bolt, the shank is drawn into rigid clamp engagement in the groove 28. The pressure exerted laterally against the outer face of the rotatable plate 17 serves to clamp the toothed faces of the two plates together. It will be evident that by merely backing off the nut 23, the colter shank will be released for permitting any one or all of the aforesaid adjustments. Thus the shank can be raised or shifted longitudinally in the eye 19' for changing the cutting depth of the colter. Also by axially rotating the shank in the eye 19', the lower offset portion 11 of the shank can be swung to right or left, so as to shift the plane of travel of the colter laterally in any desired relation to the point of the plow. Finally, by rotating the revolvable clamping plate 18, the shank can be swung fore and aft through an arc having the axis of the bolt 19 as its center, thereby permitting the point of cutting of the colter to be adjusted forwardly or rearwardly with respect to the plow point, and also affording an additional depth adjustment. Having given the colter shank its desired setting in any one or all three of these adjustments, it is only necessary to tighten up on the nut 23 to clamp all three adjustments simultaneously.

According to the manner of making these adjustments as thus far described, it will be evident that the angular adjustments between the plates 17 and 18 can be no finer than the width of one tooth. The rearward thrust imposed on the colter is comparatively heavy, and, accordingly, it is desirable that the teeth be constructed relatively wide and deep to withstand these pressures. On the other hand, it is frequently desirable to adjust the colter shank through a comparatively small arc, narrower in width than the width of one of these teeth. Provision is made for these fine adjustments in the following manner:

Both plates 17 and 18 are formed with the same number of teeth, but such number is an odd number. For example in the construction shown, each plate is provided with twenty-five teeth although it will, of course, be understood that the plates may be provided with any desired number of teeth, so long as each plate has the same odd number of teeth. However, it is obvious that a number of teeth might be omitted from the rosettes midway between the positions indicated in Figure 2 as $d$ and $c$—$b$—$c$. Each rosette might, for example, have a set of teeth of approximately five or six on one side and another set of five or six oppositely disposed from said first set. With this arrangement the rosettes will still be operable to effect an angular adjustment equal to a fraction of a tooth, but the total number of teeth in the two sets might be an even number. From this it is evident that the rosettes need not necessarily carry an odd number of teeth inasmuch as the essential characteristic of the construction is that the ridges of the teeth on one side of the rosette are diametrically disposed in alignment with the spaces or valleys formed between the teeth on the opposite side of the rosette.

Since this arrangement results in each tooth lying diametrically opposite a tooth space or valley, around the entire face of the plate, assume now, that it is desired to effect an angular adjustment of less than the width of one tooth, and that the tooth designated $a$ on the plate 18 has been engaging in the valley designated $b$ in the plate 17. If the plate 18 is rotated to bring the tooth $a$ into registry with either of the valleys $c$ to each side of the valley $b$, it will be evident that the plate 18 will have been revolved through the width of one full tooth. However, if the plate 18 can be revolved through 180 degrees without requiring corresponding rotation of the colter shank, the tooth $a$ can be placed in one or the other of the valleys $d$, with a resultant angular adjustment of the shank of the width of only half a tooth.

The above is made possible by the fact that the colter shank can be reversed in the clamping groove 28 to have its lower end extend from either end of the groove. Thus, if in the act of making an angular adjustment of the shank from any previously set position, the full tooth adjustment of the plate 18 will not permit of the desired fineness of adjustment, it is only necessary to release the shank completely from the groove 28 and to then revolve the plate 18 through a half revolution, whereupon by reengaging the shank in the groove, the plate and shank can be given an angular adjustment corresponding to the width of only half a tooth. It will be apparent that this same manner of securing a fine adjustment can be followed with the colter shank in any angular position. After making such fine adjustment, the retightening of the nut 23 will firmly clamp the shank in each of its adjustments, in the manner above described.

If desired, the outer face of the rotatable clamping plate 18 may be provided with a second groove at right angles to the groove 28 for permitting the shank to be clamped in another angular position on the rotatable clamping plate. It will be understood that in lieu of forming a groove or grooves in the clamping plate, the latter may be constructed with a suitable arrangement of lugs projecting from its outer face and forming shoulders substantially equivalent to the shoulder formed by the sides of the groove 28.

While, for the purpose of illustrating a specific embodiment, the invention has been shown in the form of an adjustable support for a colter shank, it will be understood that the essential features of the invention can be embodied in analogous supports for any use. It will also be apparent that the approximately half revolution adjustment, which has been described above as occurring between the colter shank and the rotatable plate, may be made to occur between the relatively stationary supporting member and the relatively stationary plate.

What I claim as my invention and desire to secure by Letters Patent is:

1. The combination with a relatively stationary member, and a relatively movable member adapted to be mounted on said relatively stationary member in different angular positions, of supporting means for connecting said members together comprising two toothed clamping plates adapted to be clamped together in different angular positions with their teeth interlocked, the opposing surfaces of each of said plates having an odd number of radially extending teeth, one of said plates being secured to one of said members, and means for securing the other of said plates to the other of said members in approximately diametrically opposite positions, whereby the latter plate can be rotated relatively to the other plate through approximately a half revolution to permit angular adjustments between said members of less than the width of one tooth of said plates.

2. An adjustable support for mounting a colter shank on a plow comprising a relatively stationary clamping plate adapted for mounting on the plow frame, a clamping plate rotatable through an arc of approximately one hundred and eighty degrees and adapted to cooperate with said stationary clamping plate, each of said clamping plates having an odd number of radially extending teeth formed on their opposing surfaces, a groove extending diametrically across the outer face of said rotatable clamping plate, and means for securing the colter shank in said groove, said shank being extendible from either end of said groove whereby said rotatable clamping plate can be revolved through approximately a half revolution independently of said colter shank for obtaining angular adjustment of the shank of less than the width of one tooth on said plates.

3. An adjustable support for a colter shank comprising a radially toothed plate adapted for stationary mounting and having an odd number of teeth, a cooperating radially toothed plate also having an odd number of teeth and adapted for rotative adjustment relative to said stationary plate through an arc of approximately one hundred and eighty degrees, said rotatable plate having a groove extending diametrically across its outer face, and an eye bolt passing through said plates, the colter shank being adapted to lie in said groove and extend through the eye of said bolt.

4. In combination, a clamping plate adapted for stationary mounting on a plow beam, a cooperating clamping plate adapted for rotative adjustment relative to said stationary plate through an arc of approximately one hundred and eighty degrees, each of said plates having the same odd number of radially extending teeth formed in their clamping surfaces, an eye bolt passing centrally through said plates and through said plow beam and receiving a nut over its end on the opposite side of said plow beam, said rotatable plate having an enlarged opening therein for receiving the eye portion of said bolt, a groove extending diametrically across the outer face of said rotatable plate, a colter shank having an offset lower end, an arm swivelled to said offset lower end, and a colter pivotally supported on said arm, said colter shank engaging in said groove and extending through the eye of said bolt, said bolt clamping said shank in said groove and clamping both of said plates together.

5. The combination with two members adapted to be connected together in different angular positions, of supporting means for connecting said members together comprising two relatively rotatable rosettes adapted to be clamped together, the opposing surfaces of said rosettes each having an odd number of teeth thereon, and means for connecting said members to said rosettes whereby the odd numbers of teeth on said rosettes can be utilized, through rotation of one of said rosettes through an arc of approximately one hundred and eighty degrees, to obtain fractional tooth adjustments between said members.

6. In apparatus for connecting two members in different adjusted angular relationship, two toothed plates adapted to be clamped together, one of said plates having at least one tooth on one side thereof and at least two teeth diametrically opposite with the ridge of said first named tooth disposed in direct alignment with the valley formed between said latter two teeth, the teeth of the second plate being adapted to cooperate with the teeth of the first plate to hold the said plates in adjusted position whereby when the second plate is turned substantially a half revolution relative to the member carrying it fractional tooth adjustments of the said members may be effected, and means for clamping said plates together.

7. The combination with two members adapted to be connected together in different angular positions, of supporting means for connecting said members together, said means including two relatively rotatable rosettes adapted to be clamped together, and means for simultaneously clamping the rosettes and the members together, there being a plurality of teeth on each rosette, said teeth at one side of the rosettes being aligned with the depressions formed between the oppositely disposed teeth at the other side of the rosettes, so that when one of the rosettes is rotated through an arc of approximately 180 degrees, fractional tooth adjustments between said members may be had.

8. The combination with two members adapted to be connected together in different angular positions, of supporting means for connecting said members together, comprising two relatively rotatable rosettes adapted to be clamped together, the opposing surfaces of said rosettes each having a plurality of teeth thereon, the teeth at one side of one rosette being directly aligned with relation to the spaces between the oppositely disposed teeth, so that fractional tooth adjustment between said rosettes may be obtained by rotating one of said rosettes through an arc of approximately 180 degrees, and means for connecting said members to said rosettes.

9. The combination with two members adapted to be connected together in different angular positions, of means for connecting said members together, said means comprising two relatively rotatable plates adapted to be clamped together, the opposing surfaces of said plates each having a plurality of teeth thereon, certain teeth on each plate being arranged in aligned relationship to the valleys between the diametrically oppositely disposed teeth, and means for connecting said members to said plates, whereby upon rotation of one of said plates through substantially 180 degrees relative to the member to which it is connected, the members may be adjusted to an extent less than one tooth.

10. An adjustable support for a colter shank of an implement, said support comprising a plate having a plurality of teeth and adapted for stationary mounting on the implement, the teeth on said plate at one side thereof being aligned with the hollow spaces between the opposite teeth at the other side of the plate, a cooperating radially toothed plate adapted for rotative adjustment through an arc of approximately 180 degrees relative to said stationary plate and arranged to be clamped thereto, shoulders on the other side of said rotatable plate, and means for securing the colter shank to said shoulders with the lower end of the shank extending from either one of two diametrically opposite points of said rotatable plate to permit fractional tooth adjustments of said latter plate.

11. The combination with two members adapted to be secured together, of means for securing said members together in different angular adjustments, said means comprising a pair of relatively movable disks having mutually cooperating serrations thereon, said pair of disks having means whereby they are connected respectively to said members, said means connecting one of said disks to the corresponding member in a plurality of positions, said serrations being disposed on each of said disks in a manner to allow said members to be relatively adjusted in an angular position equal to a fraction of a serration when said one disk is moved from one position to another.

CARL G. STRANDLUND.